Patented Apr. 23, 1929.

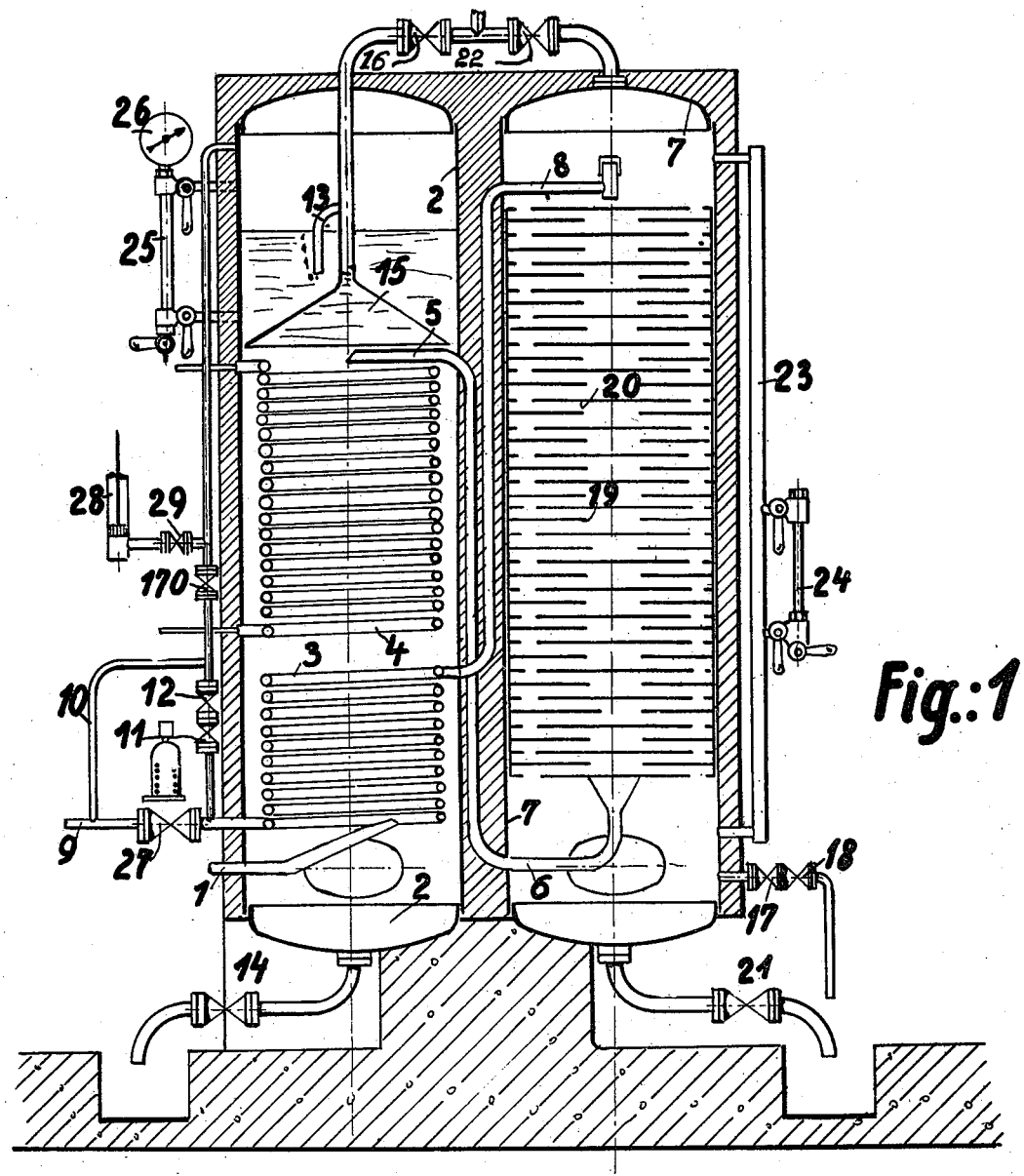
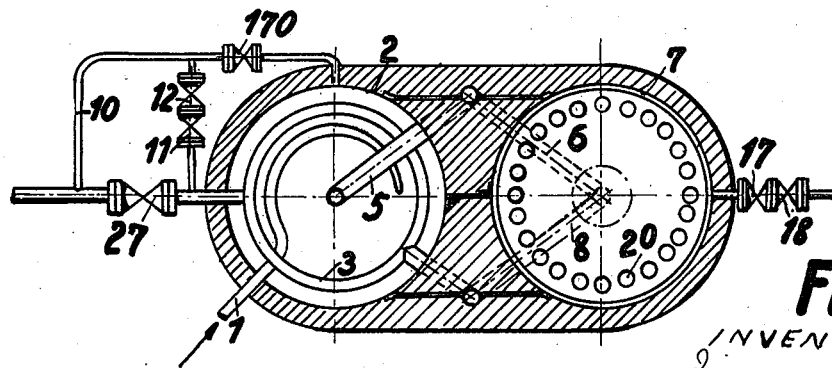

1,710,374

UNITED STATES PATENT OFFICE.

IGNACY MOŚCICKI, OF LWOW, POLAND.

PROCESS OF AND APPARATUS FOR DEWATERING OIL EMULSIONS.

Application filed July 31, 1923. Serial No. 654,836.

There are a number of processes by means of which the components of a stable mixture of oil and water, known as an emulsion, are separated by continuous working. In these processes the emulsion is heated to a temperature about 100° C. and is slowly caused to flow in this condition through a spacious container well protected against loss of heat. The separation of the two components according to their specific weight is accelerated by a relaxation of their consistency due to heat and by the increased difference between the specific weight of oil and that of water owing to the dissimilar coefficients of expansion of water and oil. In order to prevent the formation of disturbing vapors, the process is carried out under a pressure higher than that of the vapor evolved by the two components at the temperature of the container in which they are separated.

The invention provides an apparatus for carrying out this kind of process. The said apparatus is simple and compact and is particularly suitable for treating emulsions loaded with very coarse impurities. The apparatus is designed also with a view to dealing with the periodical fluctuations occurring in the vapor pressure in deep mineral oil wells under exploitation.

A constructional example of the apparatus according to the invention is illustrated in the accompanying drawings in which—

Figure 1 is a sectional elevation; and

Figure 2 is a plan view in cross-section.

The emulsion to be purified is pumped as uniformly as possible from the well into the fluid-proof cylindrical heater 2 through the pipe 1, the end of which is in a tangential position in the heater and ends in a thin taper with small opening. The fluid is thus forced into the said heater 2 at a high velocity which in combination with the tangentially positioned end of the pipe causes the fluid to circle around in the heater 2, for the purpose of producing a lively heat exchange between the fluid and the heating coils 3 and 4. The hot purified oil flows through the coil 3 and steam at a pressure of about 7 atmospheres flows through the coil 4.

As heretofore set forth the process is carried out under a pressure in excess of that of the vapors evolved by the components of the emulsion at the temperature of the container in which they are separated. This pressure will depend upon the temperature of the emulsion during treatment which in turn depends upon the temperature of the coil 4, but the pressure required is ordinarily in excess of 100 pounds per square inch, and generally from approximately 125 to 150 pounds per square inch when steam at a gage pressure of about seven atmospheres (approximately 170° C.) is caused to flow through the coil 4 as indicated above to heat the emulsion.

The emulsion heated in the manner described above reaches a separator 7 through the pipes 5 and 6; the dimensions of the separator are the same as those of the heater. The oil freed from its impurities and water flows out of the upper portion of the separator through the pipe 8 into the heating coil 3 in which it is cooled by the cold raw emulsion surrounding the said coil. The purified oil passes thereafter through the valves 11 and 12, through the pipes 10 and 9 and reaches a suitable storage receptacle.

The velocity of flow of the material to be treated is regulated so that every particle of oil remains in the apparatus for about 6 hours though with some oils less time is sufficient. The oil remains in the heater 2 for about one-third this period of time. As already stated, the fluid is constantly circling around the vertical axis of the heater owing to its tangential inrush into the latter at a high initial velocity. Eddy currents are produced within the liquid owing to the heat taken off the coils 3 and 4 and owing to the boiling of the components, the vapor pressure of which becomes greater (while the liquid is heated) than that prevailing in the apparatus. The components of the material to be treated are partially separated notwithstanding the turbulence prevailing in the heater 2; the heavy solid impurities (mostly of mineral origin) collect at the lower portion of the heater 2 wherefrom they are discharged at intervals through the sludge-draining cock 14. The light and solid components (mainly of vegetable or animal origin) collect at the upper portion of the trap or screen 15 and are also discharged from the heater, together with a certain quantity of oil, by opening the cock 16 for an instant.

Gases and vapors evolved by the heated material collect at the upper portion of the heater 2 and are turned to account as a resilient compensating means for variations in the rate of inflow of the emulsion or for the matter suddenly discharged through the draining cocks. The function of the narrow tube 13 is to lead away bubbles of gas or vapor initially formed under the trap or screen 15. The pressure of the said gas or vapor may be read on a high-pressure gauge 26; excess of gas or vapor is allowed to escape into the discharge pipe 9 by gradually opening the valve 170.

The heater 2 fulfills all conditions required for the material to be completely purified in the separator 7. The said heater relieves the separator of the rough or preliminary separation of water and other impurities; the light components are expelled in the heater so that no vapor is formed in the separator in which a temperature prevails which is somewhat lower than that around the pipe 5 owing to unavoidable loss of heat. The pressure on the oil in the apparatus even under the irregularities of the feed pump remains substantially uniform owing to the cushion of gas and vapor. The velocity of flow is altered by the regulating valves 12 (for oil) and 18 (for water).

The material passes through the separator uniformly and quietly. Horizontal baffles 19 and 20 provided with central and lateral openings in alternating order compel the material to cover horizontally a large portion of the distance travelled through in the separator and also prevent undesired movements caused by variations in temperature.

The mingled oil and water particles have a tendency to separate according to their specific weight; the oil particles rise and the water particles sink until the upper portion of the separator 7 contains oil without any admixture of water and the lower portion thereof contains water without any admixture of oil. Any heavy matter separated in the said separator is expelled through the valve 21, the gases and floating unsoluble matter together with a certain quantity of oil being expelled at intervals through the valve 22.

The proportion of oil to water in the separator is read off the level indicator 24 fitted to the pipe 23; these readings, together with those taken at the level indicator 25 are means whereby the outflow of oil and water may be correctly regulated.

A spring-loaded safety-valve 27 protects the apparatus against any detrimental pressure arising from inattention on the part of the attendant. The air pump 28 and valve 29 serve the purpose of producing the required pressure in the apparatus before it is started and of pumping up the gas chamber when the emulsion treated is poor in gas.

The apparatus is very compact and may therefore be totally enclosed by a covering of heat-insulating material. The apparatus may comprise a number of heaters and separators so that the oil emulsion flows through several heaters first and through one or more separators afterwards.

I claim:

1. Apparatus for de-watering oil emulsions comprising a closed cylindrical chamber for heating the emulsion to be treated under pressure, means to inject the emulsion into the chamber at high velocity tangentially to the walls of the chamber, means for heating the emulsion in the chamber, a secondary separating chamber in which the treated emulsion may separate into oil and water, and means for conveying the treated emulsion from the heating chamber to the separating chamber, said emulsion conveying means being in communication with the heating chamber above the level of the tangentially arranged emulsion injector whereby the body of emulsion in the heating chamber will have a circulatory movement while being heated.

2. Apparatus for de-watering oil emulsions comprising a closed cylindrical chamber for heating the emulsion to be treated under pressure, means for continuously injecting the emulsion into the chamber at high velocity tangentially to the walls of the chamber, means for heating the emulsion in the chamber, a secondary separating chamber in which the treated emulsion may separate into oil and water, and means for conveying the treated emulsion from the heating chamber to the lower portion of the separating chamber, said emulsion conveying means being in communication with the heating chamber above the level of the tangentially arranged emulsion injector whereby the body of emulsion in the heating chamber will have a circulatory movement while being heated.

3. Apparatus for de-watering oil emulsions comprising a closed cylindrical chamber for heating the emulsion to be treated under pressure, means to inject the emulsion into the lower part of the chamber at high velocity tangentially to the walls of said chamber, means for heating the emulsion in the chamber, a separating chamber in which the treated emulsion may separate into oil and water, means for conveying the treated emulsion from the upper portion of the heating chamber to the lower portion of the separating chamber, and valve controlled means of communication between the upper portions of the heating chamber and the separating chamber.

4. Apparatus for de-watering oil emulsions comprising a closed cylindrical chamber for heating the emulsion to be treated under pressure, means for injecting the emulsion into the lower portion of said chamber at high velocity tangentially to the walls of such chamber, heating means disposed within the chamber for heating the emulsion, a secondary separating chamber in which the treated emulsion may separate, and means for conveying the treated emulsion from a point in the treating chamber above the heating means to the lower portion of the separating chamber.

5. Apparatus for de-watering oil emulsions comprising a closed cylindrical heating chamber for heating the emulsion to be treated under pressure, means to inject the emulsion into the heating chamber at high pressure tangentially to the walls of the chamber, heating coils disposed within the chamber above the level of the emulsion injecting means, a separating chamber in which the treated emulsion may separate into oil and water, and means for conducting the treated emulsion from the upper portion of the heating chamber to the lower portion of the separating chamber.

6. Apparatus for de-watering oil emulsions comprising a closed heating chamber for heating the emulsion to be treated under pressure, means to introduce the emulsion into the lower portion of the chamber, a plurality of heating coils within the chamber, a separating chamber in which the treated emulsion may separate into oil and water, means for conveying the treated emulsion from the upper part of the heating chamber to the lower part of the separating chamber, and means in communication with the upper part of the separating chamber for conveying oil therefrom to one of the heating coils in the heating chamber whereby the hot separated oil from the separating chamber will pass through one of the coils in the heating chamber and give up a portion of its heat to the emulsion in the heating chamber.

7. Apparatus for de-watering oil emulsions comprising a closed heating chamber for heating the emulsion to be treated under pressure, means to introduce the emulsion into the lower portion of the heating chamber, means for heating the emulsion in the heating chamber, said heating means being disposed above the point of introduction of the emulsion, a separating chamber in which the treated emulsion may separate into oil and water, and means for conveying the treated emulsion from the upper portion of the heating chamber to the lower portion of the separating chamber, said heating chamber being provided at the top thereof with a vapor space to equalize variations in pressure in such chamber.

8. Apparatus for de-watering oil emulsions comprising a closed heating chamber for heating the emulsion to be treated under pressure, means to introduce the emulsion into the lower portion of the heating chamber, means for heating the emulsion in the heating chamber, said heating means being disposed above the point of introduction of the emulsion, a separating chamber in which the treated emulsion may separate into oil and water, means for conveying the treated emulsion from the upper portion of the heating chamber to the lower portion of the separating chamber, said heating chamber being provided at the top thereof with a vapor space to equalize variations in pressure in such chamber, and an air pump in communication with the said gas and vapor chamber.

9. Apparatus for de-watering oil emulsions comprising a closed cylindrical chamber for heating the emulsion to be treated under pressure, means for introducing the emulsion into the chamber adjacent the lower portion thereof, means for heating the emulsion in the said chamber, a pressure pump in communication with the upper portion of the interior of the heating chamber adapted to produce a desired high pressure therein, a separating chamber in which the treated emulsion may separate into oil and water, and means for conveying the treated emulsion from the upper part of the heating chamber to the lower part of the separating chamber.

10. Apparatus for de-watering oil emulsions comprising a closed chamber for heating the emulsion to be treated under pressure, means to introduce the emulsion at high velocity into the lower portion of the chamber, heating coils disposed in the chamber above the level of the emulsion introducing means, a separating chamber in which the treated emulsion may separate into oil and water, means for conveying the treated emulsion from the upper portion of the heating chamber to the lower portion of the separating chamber, and a trap disposed in the upper part of the heating chamber for separating and removing from the upper portion of the heating chamber lighter impurities collected therein.

11. Apparatus for de-watering oil emulsions comprising a closed heating chamber for heating the emulsion to be treated under pressure, means to introduce the emulsion at high velocity at the lower portion of the chamber, means for heating the emulsion in the chamber, a pump in communication with the upper portion of the heating chamber for producing a high pressure on the emulsion therein, means for maintaining a desired level of emulsion in the heating chamber, a separating chamber in which the emulsion may separate into oil and water, and means for conveying treated emulsion from the upper portion of the heating chamber to the lower portion of the separating chamber.

12. Apparatus for de-watering oil emulsions comprising a closed heating chamber for heating the emulsion to be treated under pressure, means to introduce the emulsion at high velocity into the lower portion of the chamber, means for heating the emulsion in the chamber, a pump for producing a high pressure on the emulsion in the heating chamber, a separating chamber in which the emulsion may separate into oil and water, means for conveying treated emulsion from the upper portion of the heating chamber to the lower portion of the separating chamber, and valve controlled means of communication between the upper portions of the heating chamber and separating chamber.

13. Apparatus for de-watering oil emulsions comprising a closed heating chamber, means for introducing emulsion into said heating chamber eccentrically thereto at a high velocity, a separating chamber communicating with said heating chamber a substantial distance above the level of said emulsion introducing means, heating means arranged in said heating chamber between its point of communication with said separating chamber and said emulsion introducing means, and means for drawing off demulsified oil from the upper portion of said separating chamber, said last named means including a heat exchanging portion arranged beneath the surface of the emulsion in said heating chamber and in proximity to said emulsion introducing means.

14. Apparatus for de-watering oil emulsions comprising a cylindrical heating chamber, means for introducing emulsions at a high velocity into the lower portion of said heating chamber substantially tangentially thereof, heating coils arranged in said chamber above said emulsion introducing means, a separating chamber arranged adjacent said heating chamber, and a conduit communicating at one end with the lower portion of said separating chamber and at its other end with the interior of said heating chamber above said coils.

15. Apparatus for de-watering oil emulsions comprising a cylindrical heating chamber, means for introducing emulsions at a high velocity into the lower portion of said heating chamber substantially tangentially thereof, heating coils arranged in said chamber above said emulsion introducing means, a separating chamber arranged adjacent said heating chamber, a conduit communicating at one end with the lower portion of said separating chamber and at its other end with the interior of said heating chamber above said coils, and means for drawing off demulsified oil from said separating chamber including a heat exchanging coil arranged in said heating chamber between said first named coil and said emulsion introducing means.

16. Apparatus for de-watering oil emulsions comprising a closed heater for heating the emulsions under pressure, heating coils therein, a closed separator connected therewith and adapted to carry the oil emulsions at a lower temperature than that at which it leaves the heater, means whereby the emulsified oil enters near the bottom of the heater, means whereby it leaves the top, and enters near the bottom of the separator, and means whereby clear oil leaves at the top of the separator and passes into a heating coil of the heater, and a series of deflecting horizontal baffles in the separator.

17. The process of de-watering oil emulsions which consists in introducing the emulsion in a continuous stream of high velocity into a heating chamber tangentially thereof, maintaining a body of the emulsion in the heating chamber with its surface a substantial distance above the point of introduction of the emulsion, and slowly drawing emulsion from said heating chamber at a point adjacent to but below the surface of the body of the emulsion and passing it to a separator.

18. A process of de-watering oil emulsions consisting in continuously feeding the emulsion into a heater at high velocity and tangentially to the walls of the same so as to cause the same to rise in eddies into contact with heating coils, and then feeding the emulsion to the lower portion of an adjacent separator in which it rises slowly to separate the emulsion into its components, the purified oil flowing out of the upper portion of the separator and the water flowing out of the lower portion of the same.

In testimony whereof I have affixed my signature.

IGNACY MOŚCICKI.